United States Patent
Kekre et al.

(10) Patent No.: US 7,310,714 B2
(45) Date of Patent: *Dec. 18, 2007

(54) METHOD AND APPARATUS FOR CREATING A VIRTUAL DATA COPY

(75) Inventors: Anand A. Kekre, Pune (IN); John A. Colgrove, Los Altos, CA (US); Oleg Kiselev, Palo Alto, CA (US); Ronald S. Karr, Palo Alto, CA (US); Niranjan S. Pendharkar, Pune (IN)

(73) Assignee: VERITAS Operating Corporation, Mountain View, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 10/769,317

(22) Filed: Jan. 30, 2004

(65) Prior Publication Data

US 2004/0186970 A1 Sep. 23, 2004

Related U.S. Application Data

(63) Continuation of application No. 10/143,059, filed on May 10, 2002, now Pat. No. 6,785,789.

(51) Int. Cl.
*G06F 12/00* (2006.01)
(52) U.S. Cl. ...................................... 711/162
(58) Field of Classification Search ................ 711/162, 711/156; 714/6; 707/204
See application file for complete search history.

(56) References Cited

U.S. PATENT DOCUMENTS

| | | | |
|---|---|---|---|
| 4,096,567 A * | 6/1978 | Millard et al. ................ 707/10 |
| 5,210,866 A * | 5/1993 | Milligan et al. ................ 714/6 |
| 5,574,874 A | 11/1996 | Jones et al. .................. 395/376 |
| 5,610,893 A * | 3/1997 | Soga et al. ............... 369/53.24 |
| 6,269,431 B1 | 7/2001 | Dunham ...................... 711/162 |
| 6,282,610 B1 * | 8/2001 | Bergsten ...................... 711/114 |
| 6,785,789 B1 | 8/2004 | Kekre et al. ................. 711/162 |
| 6,792,518 B2 | 9/2004 | Armangau et al. ......... 711/162 |
| 2003/0041220 A1 | 2/2003 | Peleska ....................... 711/162 |

FOREIGN PATENT DOCUMENTS

| EP | 0 332 210 A2 | 9/1989 |
|---|---|---|
| EP | 0 566 966 A2 | 10/1993 |
| EP | 1 091 283 A2 | 4/2001 |

\* cited by examiner

*Primary Examiner*—Hiep T. Nguyen
(74) *Attorney, Agent, or Firm*—Campbell Stephenson LLP

(57) ABSTRACT

A virtual copy of data stored in a first memory is created in a second memory. Creating the virtual copy includes, in one embodiment, creating first and second tables in memory each one of which comprises a plurality of multibit entries. Each entry of the first table corresponds to a respective memory region of the first memory. Each entry of the second table corresponds to a respective memory region of the second memory. The first bit of the first and second tables indicates whether the corresponding memory region of the first and second memories, respectively, contains valid data. The second bit of the first and second tables indicates whether data in the corresponding memory region of the first and second memories, respectively, has been modified since the creation of the first and second tables, respectively.

27 Claims, 11 Drawing Sheets

VOLUME (x)

| n | $v_x(n)$ | $m_x(n)$ |
|---|---|---|
| 1 | 1 | |
| 2 | 0 | |
| 3 | | |
| 4 | | |
| ⋮ | | |
| $n_{max}$ | | |

―120

VOLUME (z)

| n | $v_z(n)$ | $m_z(n)$ |
|---|---|---|
| 1 | | |
| 2 | | |
| 3 | | |
| 4 | | |
| ⋮ | | |
| $n_{max}$ | | |

| n | $v_x(n)$ | $m_x(n)$ | $r_x(n)$ |
|---|---|---|---|
| 1 | | | |
| 2 | | | |
| 3 | | | |
| 4 | | | |
| ⋮ | | | |
| $n_{max}$ | | | |

METHOD AND APPARATUS FOR CREATING A VIRTUAL DATA COPY

CROSS-REFERENCE TO RELATED APPLICATIONS

This application is a continuation of U.S. patent application Ser. No. 10/143,059, entitled "Method and Apparatus for Creating a Virtual Data Copy," filed May 10, 2002, now U.S. Pat. No. 6,785,789 and naming Anand A. Kekre, John A. Colgrove, Oleg Kiselev, Ronald S. Karr and Niranjan S. Pendharkar as inventors.

BACKGROUND OF THE INVENTION

Businesses employ large-scale data processing systems for storing and processing their data. FIG. 1 illustrates relevant components of an exemplary data processing system 10 having a host computer system 12, a transaction log 14, a primary data storage system 16, and a secondary data storage system 18. Primary and secondary data storage system 16 and 18 include data memories 22 and 24, respectively, which store primary and back up data volumes, respectively, which will be more fully described below. The primary data volume is the "working" data volume or the contents of data that are accessed by host computer system 12 in response to host computer system 12 receiving a transaction (i.e, instruction) to read, write or otherwise modify data. The back up data volume is a point in time copy of the primary data volume and is used when primary data storage system fails or when the primary data volume contained therein is logically corrupted or destroyed by operator error or invalid software behavior.

Host computer system 12 accesses (e.g., read, write, or otherwise modify) data in primary data volume of memory 22 in accordance with an access transaction received thereby. When computer system 10 receives a transaction to access, for example, a particular file of data in the primary data volume, host computer 12 first accesses an index table which maps a file name of the file to the location of one or more physical blocks of memory in memory 22. Once the location of the of memory blocks are known, host computer system 12 can access the memory blocks and read or write data thereto in accordance with the transaction.

Data processing systems, such as that shown in FIG. 1, often experience a logical corruption or destruction of data in their primary data volume or a physical failure in their primary data storage system. When these events occur, access to the primary data volume will be denied. Without a back up copy of the primary data, a business, which relies on its data processing system, will be severely impacted by these events.

To continue operating after a logical corruption in the primary data volume or a physical failure in their primary data storage system, business's often create a point in time "back up copy" of the primary data volume. In FIG. 1, a back up copy of the primary data volume in memory 22 can be created in memory 24 of secondary data storage system 18. Creating a back up copy of the primary data volume is a procedure well known in the art. A back up copy is created in memory 24 each time the host computer system 12 issues a backup command. Transaction log 14 maintains a copy of all transactions that modify data of the primary data volume after a back up copy of the primary volume is created. It is noted that the entire contents of the primary data volume need not be copied into memory 24 each time the primary volume is backed up. Rather, only the contents of memory blocks of memory 22 which differ from the contents of corresponding memory blocks of memory 24 need to be updated upon each primary volume back up. Moreover, the primary data volume is not backed up every time host computer system 12 writes or modifies data in the primary data volume in memory 22.

When, for example, primary data storage system 16 experiences a physical failure, the secondary data storage system 18 and the back up copy created therein can used to service read or write transactions provided to host computer system 12. However, before the back up copy can be used, the back up copy must be updated from the time it was created so that the data contents thereof mirror the contents of the primary data volume just before the failure of primary data storage system 16. In an update procedure, all transactions stored in log 14 which occurred between the time the back up copy was created and the time the failure occurred, are applied by host computer system 12 to the back up copy within secondary data system 18. Once all the transactions are applied, the back up copy should be identical to the primary data volume just before the failure, and host computer system 12 can resume processing received transactions using the updated back up copy as if it were the primary data volume.

Unfortunately, updating data in the backup copy results in a loss of the original or stable point in time copy of the primary data volume. If the secondary data storage system 18 experiences physical failure or if logical data corruption occurs in the updated back up copy due to, for example, operator error, host computer system 12, once again, will not be able to process transaction received requests. To avoid this, it is common practice to create a copy of the back up copy data, preferably in an additional data storage system (not shown). Thereafter, the the copy of the backup copy is updated using the transactions stored within the log 14. Once updated, host computer system 12 can process newly received transactions using the copy of the back up copy. Unfortunately, a substantial amount of time may be needed to copy the entire contents of the back up copy. This delay of time may be unacceptable to a business which is seeking to continue processing transactions as soon as possible after, for example, a failure of its primary data storage system 16.

SUMMARY OF THE INVENTION

Disclosed is a method for creating a virtual copy of data stored in a first memory. The virtual copy of data stored in the first memory is created in a second memory in response to a request to create a copy of all data stored in the first memory. Creating the virtual copy includes, in one embodiment, creating first and second tables in memory each one of which comprises a plurality of multibit entries. Each entry of the first table corresponds to a respective memory region of the first memory. Each entry of the second table corresponds to a respective memory region of the second memory. Each first bit of the first table indicates whether the corresponding memory region of the first memory contains valid data. Each second bit of the first table indicates whether data in the corresponding memory region of the first memory has been modified since the first table was created. Each first bit of the second table indicates whether the corresponding memory region of the second memory contains data copied from the first memory. Each second bit of the second table indicates whether data in the corresponding memory region of the second memory has been modified since the second table was created. Additionally, using the present invention more than one virtual copy of data stored in the first memory can be created at a time. Further, using the present invention, a virtual copy of the virtual copy can be created.

BRIEF DESCRIPTION OF THE DRAWINGS

The present invention may be better understood, and its numerous objects, features, and advantages made apparent to those skilled in the art by referencing the accompanying drawings.

FIG. 12A are block diagrams illustrating verification/modification tables;

FIG. 12B is a block diagram illustrating a modification/verification table;

The use of the same reference symbols in different drawings indicates similar or identical items.

DETAILED DESCRIPTION

The present invention relates to an apparatus and method for creating a virtual copy of a data volume that can be accessed soon after its creation. The virtual copy can eventually be transformed to an actual copy of the data volume. However, the present invention allows access to the virtual copy before the virtual copy is transformed to an actual copy. This concept will be more fully described below.

Figure 1:
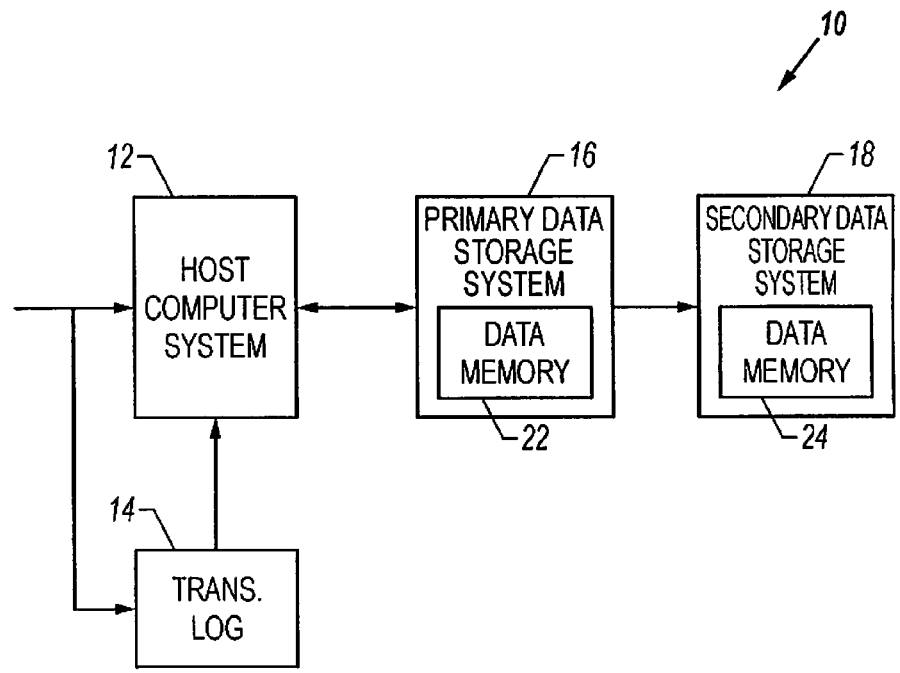
FIG. 1 is a data processing system employing storage subsystems for storing primary and secondary data volumes.
Figure 2:
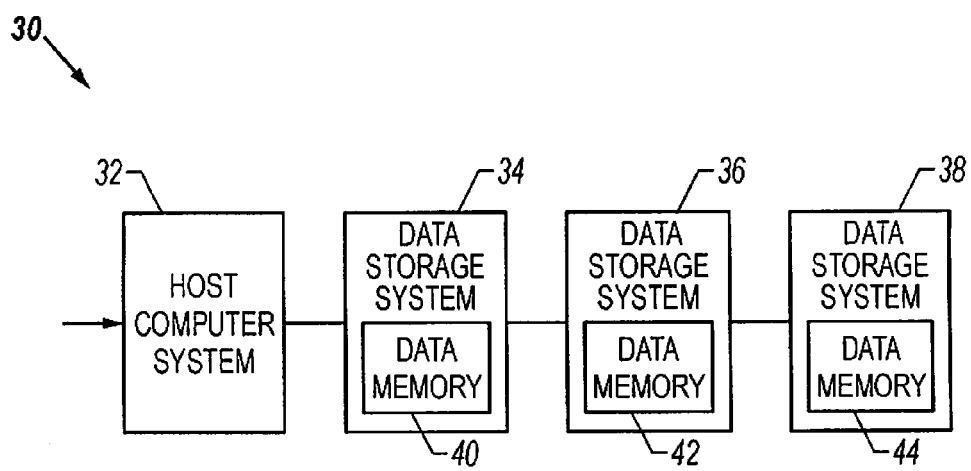
FIG. 2 is a data processing system employing one embodiment of the present invention.

FIG. 2 shows relevant components of a data processing system 30 employing one embodiment of the present invention. Data processing system 30 includes host computer system 32 and data storage systems 34, 36 and 38. Data storage systems 34, 36, and 38 include data memories 40, 42, and 44, respectively. Data memories 40-44 may take form in dynamic or static random access memory, magnetic or optical data storage disks, or magnetic or optical data storage tapes. It should be understood that data memories 40-44 should not be limited to these hardware components.

Rather, data memories 40-44 may take form in any hardware, software, or combination of hardware and software in which data may be stored and accessed. Data memories may take form of complex constructions of several hardware components acting under the direction of software. The data memories may take form in mirrored hardware.

Figure 3:
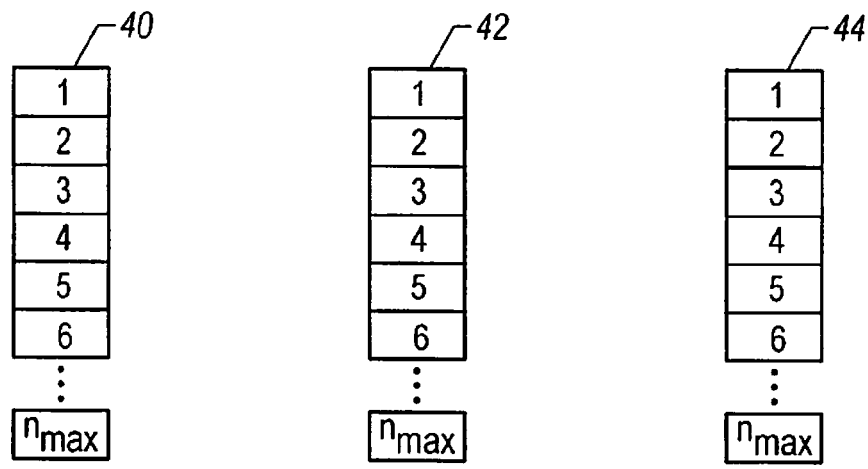
FIG. 3 are block diagrams illustrating memory structure of storage systems shown in FIG. 2.

FIG. 3 represents in block diagram form, a logical structure of data memories 40-44. As can be seen in FIG. 3 each of the data memories 40 and 42 includes $n_{max}$ memory regions or blocks into which data may be stored. The memory blocks need not be contiguous as shown in FIG. 3. The size of corresponding memory blocks in data memories 40-44 are equal. Thus, memory block 1 of memory 40 is equal in size to memory block 1 of memories 42 and 44. Each of the memory blocks within memory 40 may be equal in size to each other. Alternatively, the memory blocks in memory 40 may vary in size.

Figure 5:
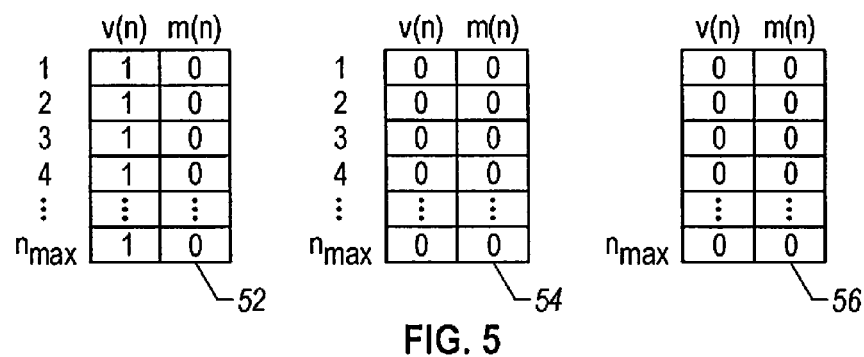
FIG. 5 illustrates in block diagram form validation/modification tables created in accordance with one embodiment of the present invention.

For purposes of illustration, it will be presumed that memory 40 includes a volume of data distributed among each of the memory blocks 1 through $n_{max}$ and that memory 42 contains no data. In one embodiment, host computer 32, in response to a request, creates in memory 42 a virtual copy of the data volume stored in memory 40 by creating in memory (either memory of the host computer 32 or memory 42) a pair of valid/modified (V/M) tables such as tables 52 and 54 in FIG. 5. Host computer associates tables 52 and 54 with memories 40 and 42, respectively. Each V/M table 52 and 54 has $n_{max}$ entries of two bits each. Each entry of table 52 corresponds to a respective memory block of memory 40, while entry of table 54 corresponds to a respective memory block of memory 42. Initially, all bits of tables 52 and all m(n) bits of table 54 may be set to logical 0. Initially, all v(n) bits of table 52 may be set to logical 1.

The first bit in each table is designated v(n) while the second bit in each table is designated m(n). V(n) in each entry, depending on its state, indicates whether the corresponding memory block of the associated memory contains valid data. For example, when set to logical 1, v(2) of table 52 indicates that memory block 2 of memory 40 contains valid data, and when set to logical 0, v(2) of table 52 indicates that memory block 2 of memory 40 contains no valid data. M(n) in each entry, depending on its state, indicates whether data within the corresponding memory block of the associated memory has been modified. For example, when set to logical 1, m(3) of table 54 indicates that memory block 3 of memory 42 contains modified data, and when set to logical 0, m(3) of table 54 indicates that memory block 3 of memory 42 contains data which has not been modified.

After creation of the virtual copy, host computer 32 may run a background process to copy data contents of memory blocks in memory 40 to corresponding memory blocks in memory 42. Eventually, this background process will completely copy the contents of the data volume to memory 42 thus transforming the virtual copy into an actual copy. However, before the background copying process is started, or before the background copying process is completed, host computer 32, in accordance with transactions received thereby, can read or write data to either the data volume in memory 40 or its virtual copy in memory 42. Relevant aspects of host computer reading from or writing data to volume in memory 40 or its virtual copy in memory 42 will be described with reference to FIGS. 4A-4C.

Figure 4A:
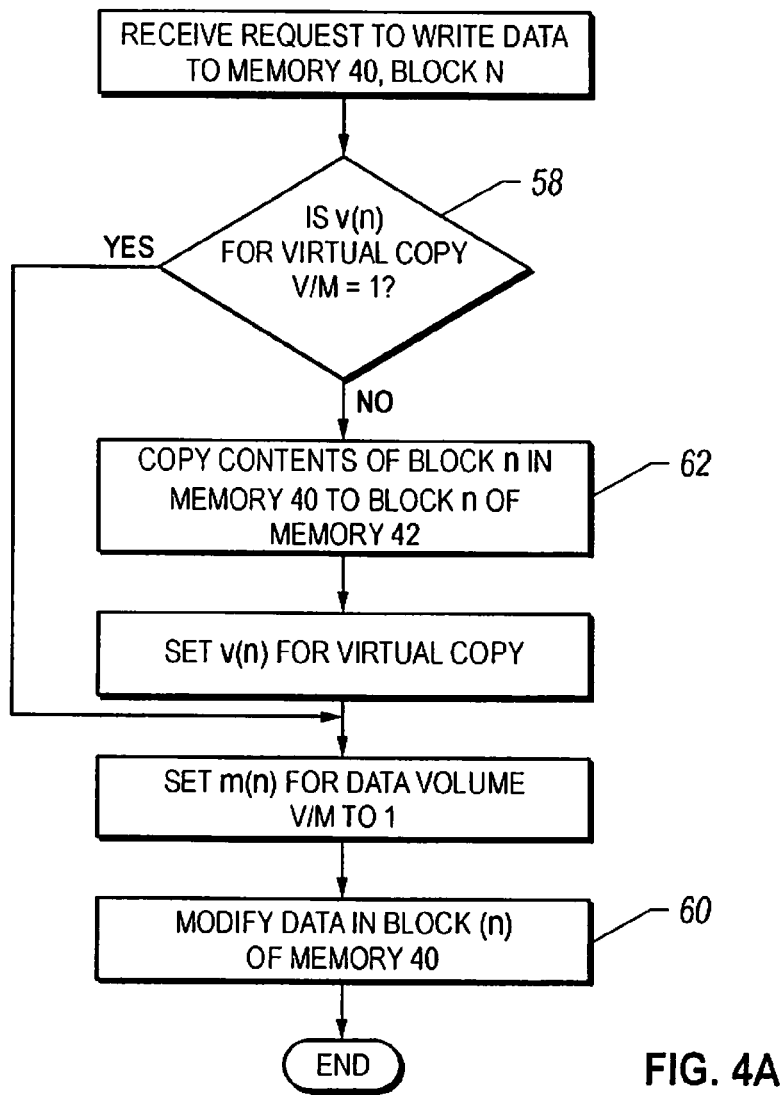
FIG. 4A is a flow chart illustrating operational aspects of writing data to memory 40 of FIG. 3.

FIG. 4A illustrates operational aspects of the host computer system 32 operating in response to receiving a request to write or modify data in block n of the primary data volume contained in memory 40 after creation of its virtual copy in memory 42. In response to a request to write data to the primary data volume within memory 40 block n, the host computer accesses the V/M table for the virtual copy to determine whether the corresponding block n of the virtual copy in memory 42 contains valid data. In other words, host computer 32 determines whether v(n) is set to 1. Block n of memory 42 will contain valid data (i.e., v(n) is set to 1) if the contents of memory 40 block n were previously copied to block n of memory 42 by the background copying process mentioned above or in response to a previous request to write or modify data in block n of memory 40 or 42.

If v(n) is set to 1, host computer system 32 modifies data in block n of memory 40 as shown in step 60. If, however, host computer system 32 determines that the v(n) for the virtual copy is set to 0, then host computer system 32 copies the contents of block n of memory 40 to block n of memory 42 and sets v(n) for the virtual copy accordingly. Thereafter, host computer system 32 sets the modification bit m(n) for the data volume to 1. Eventually, host computer system 32 modifies the data in block n of memory 40 as shown in step 60. It is noted that host computer 32 may set the modification bit m(n) to 1 after modification of data in block n of memory 40. However, for purposes of explanation, it will be presumed that host computer 32 will set modification bits prior to modification of data in corresponding memory blocks, it being understood that the present invention should not be limited thereto.

Figure 4B:
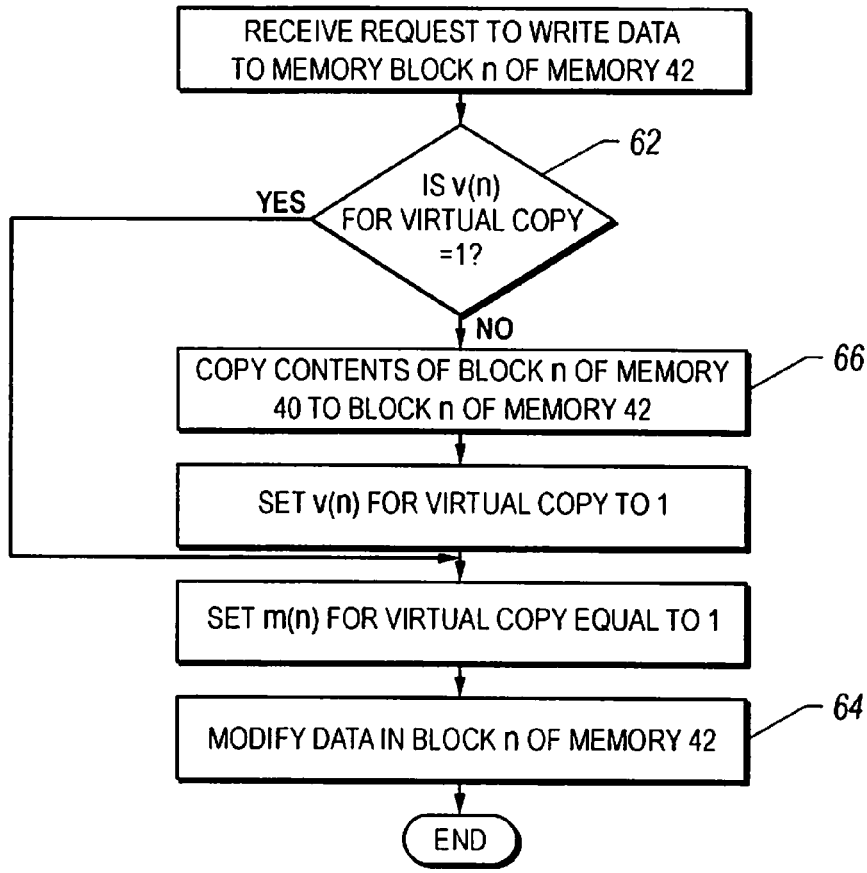
FIG. 4B is flow chart illustrating operational aspects of writing data to memory 42 of FIG. 3.

FIG. 4B illustrates operational aspects of the host computer system 32 operating in response to receiving a request to write or modify data in block n of the virtual copy contained in memory 42. More particularly, in step 62, host computer system 32 determines whether the valid bit v(n) for the virtual copy is equal to 1 in response to the host computer system 32 receiving the request. If v(n) is set to 1, then host processor 32 modifies data in block n of memory 42 in accordance with the write request it received as shown in step 64. If, however, the v(n) bit is set to 0 for the virtual copy, then the host computer, in step 66, first copies the contents of block n in memory 40 to block n of memory 42 and sets v(n) for the virtual copy to 1. Once v(n) is set to 1, host computer system 32 sets m(n) equal to 1. Eventually, host computer modifies data in block n of memory 42 as shown in step 64.

Figure 4C:
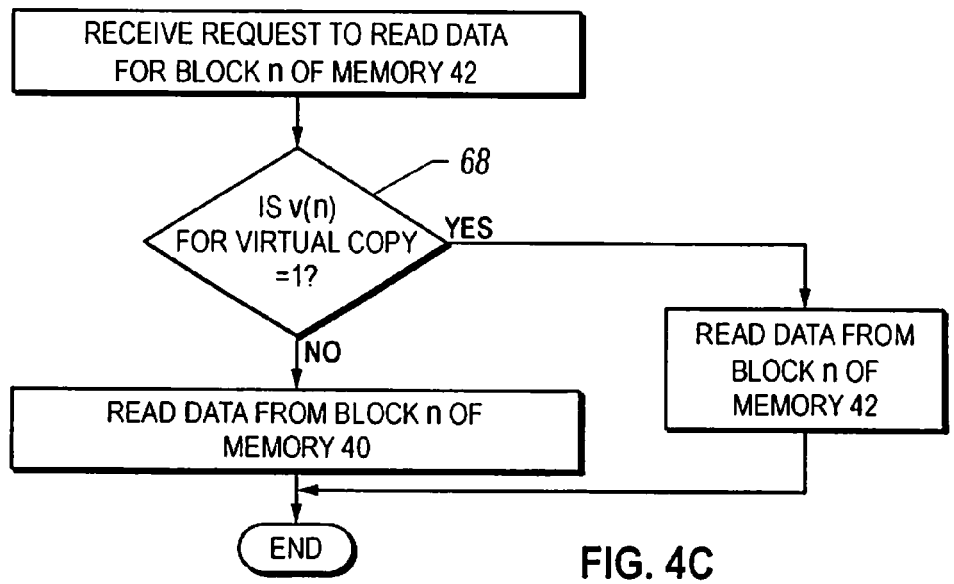
FIG. 4C is a flow chart illustrating operational aspects of reading data to memory 42 of FIG. 3.

FIG. 4C illustrates operational aspects of the host computer system 32 operating in response to receiving a request to read data from block n of the virtual copy contained in memory 42. Host computer system 32, in response to receiving a request to read data from block n from memory 42, in step 68 accesses the v(n) table for the virtual copy to determine whether v(n) is equal to 1. If v(n) is equal to 1, then data is read from block n of memory 42. If, however, the (n) is not equal to 1, then data is read from block n of memory 40.

Using the methods described with reference to FIGS. 4A-4C, host computer system 32, or any other computer system which has access to memories 40 and 42 and their corresponding tables 52 and 54, respectively, can access the virtual copy in memory 42 before all data is copied from memory 40, a process that may require a substantial amount of time to complete depending on the size of the data volume in memory 40. As will be more fully described below, modification bits m(n) such as those of tables 52 and 54, can be used to quickly and efficiently perform functions such as volume restore.

In an extension of the above, a virtual copy of a virtual copy may be created by host computer system 32. For example, after creation of the virtual copy of the data volume contained within memory 40, host computer system 32 may receive a command to create a virtual copy of the virtual copy contained in memory 42. This virtual copy of the virtual copy may be created within memory 44 of the data storage system 38 shown in FIG. 2. Upon request to create the virtual copy of the virtual copy, host computer system 32 creates a table 56 similar to that shown in FIG. 5. Initially, all entries of the table 56 are set to logical 0. Like tables 52 and 54, the first bit of each entry in table 56 is designated v(n) while the second bit of each entry in table 56 is designated m(n). Like tables 52 and 54, v(n) of table 56 when set to 1 indicates that block n of memory 44 contains a valid copy of data from corresponding memory block n of memory 42. Additionally, like tables 52 and 54, m(n) of table 56, when set to 1, indicates that the data contained in block n of memory 44 has been modified.

Host computer system 32's access to the virtual copy or the virtual copy of the virtual copy is similar to that described with reference to FIGS. 4A-4C. Additionally, host computer system 32 can access and modify the virtual copy of the virtual copy created soon after the creation thereof. For example, just after the creation of the virtual copy of the virtual copy in memory 44, host computer system 42 may receive a request to access and modify data contained in block n of memory 44. Host computer, in response to this access request, first accesses table 56 to determine whether v(n) is set to 1. If v(n) is set to logical 0, then the data contents of block n is copied from memory 42 to memory 44 if block n contains valid data. If block n of memory does not contain valid data (i.e., v(n) for block n of memory 42 is set to 0), data is copied from block n of memory 40. Once data is copied to block n, host computer system updates v(n) to logical 1. Thereafter, host computer system 32 sets m(n) to logical 1 and modifies the data copied to memory block n of memory 44. Host computer system 32 shown in FIG. 2 is capable of accessing data in any of the virtual copies created by host computer system 32.

Figure 6:
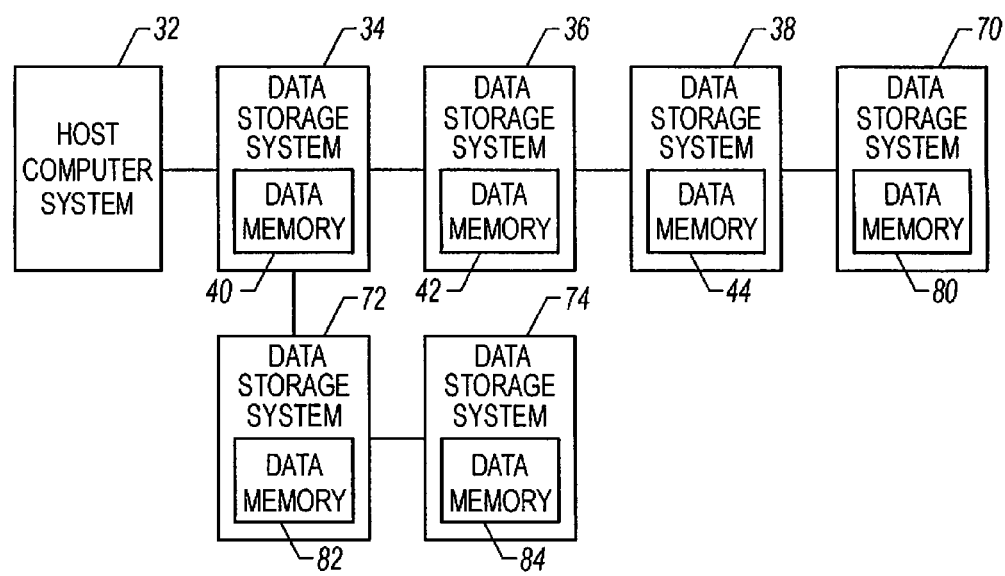
FIG. 6 illustrates a data processing system employing one embodiment of the present invention.

FIG. 6 illustrates the data processing system 30 shown in FIG. 2 with additional data storage systems 70-74 added thereto. Data storage systems 70-74 include memories 80-84, respectively, each one of which can store a virtual copy of data created by host computer system 32. Host computer system 32, or another computer system (not shown), is capable of accessing each of the virtual copies.

The virtual copies in memories 42-44 and 70-74 are related to each other. For example, memory 80 contains a virtual copy of the data volume in memory 44. In one sense, the virtual copy contained in memory 80 is a child to the parent data volume in memory 44. Any virtual copy will have a so-called parent/child relationship in which the virtual copy is a child to the parent data volume that is copied. Memory 44 contains a virtual copy of the data volume in memory 42. Memory 42 contains a virtual copy of the data volume in memory 40. Memory 84 contains a virtual copy of the data volume in memory 82. Lastly, memory 82 contains a virtual copy of the data volume in memory 40. The virtual copies in memories 42 and 82 are children to the data volume of memory 40.

The virtual copies stored in memories 42-44 and 80 were created sequentially by host computer system 32, with the virtual copy in memory 80 being created after the creation of the virtual copy in memory 44. Likewise, the virtual copy stored in memory 84 was created after creation of the virtual copy contained within memory 82. The virtual copies in memories 82 and 84 may have been created before or after creation of the virtual copies in memory 80. Although not shown, host computer system 32 creates a V/M table, like V/M tables shown in FIG. 5, with creation of each virtual copy in memories 80-84. The V/M tables associated with memories 42 and 82 relate two child virtual copies in memories 42 and 82 to a single parent data volume in memory 40.

Figure 7:
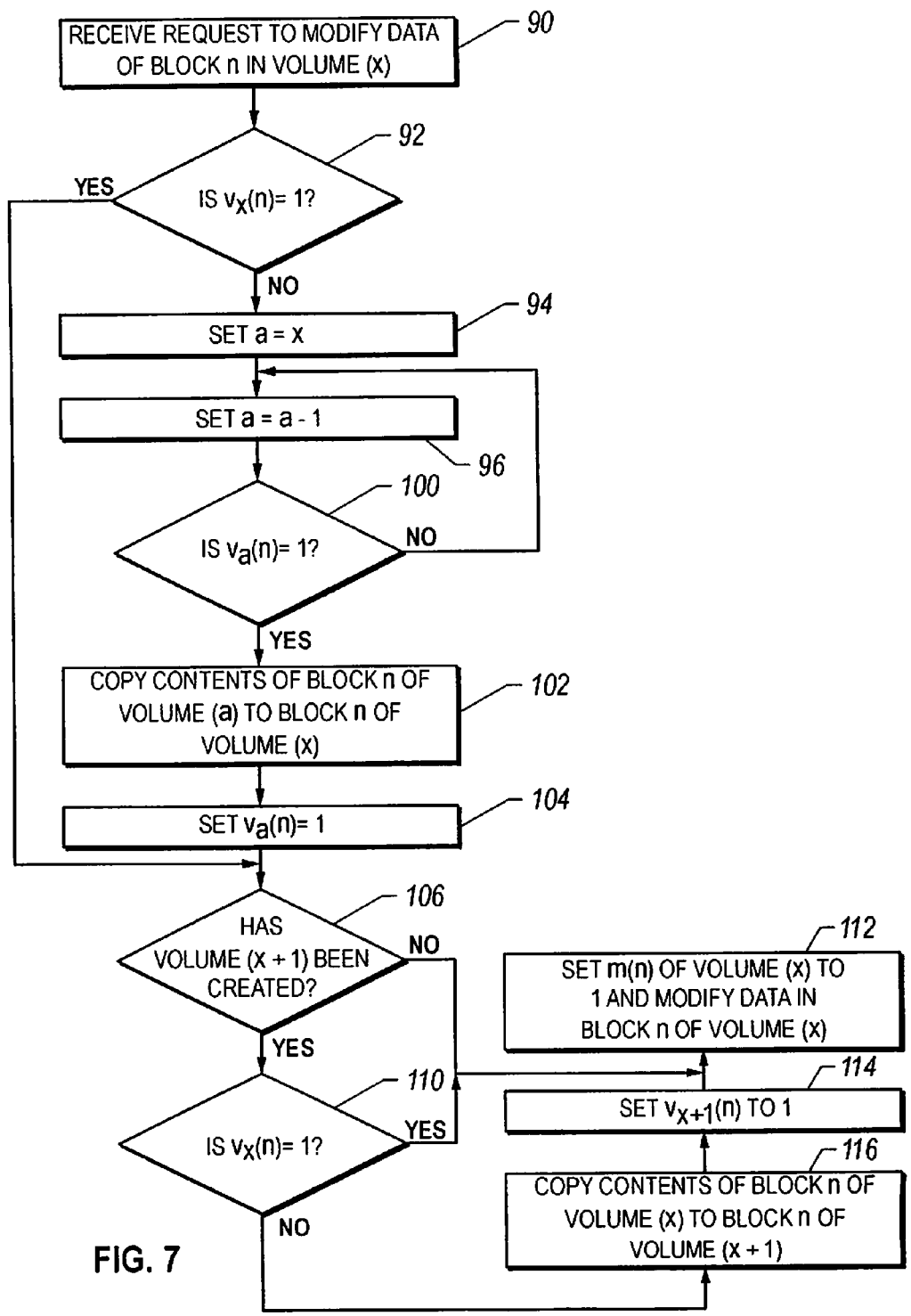
FIG. 7 is a flow chart illustrating operational aspects of modifying data in one of the memories of FIG. 6.

FIG. 6 is provided to illustrate that a large number of virtual copies can be created, each one of which is accessible by host computer system 32 (or another computer system not shown in FIG. 6) soon after their creation. FIGS. 6 and 7 below illustrate relevant steps of accessing any of the data volumes of FIG. 6.

FIG. 7 is a flow chart illustrating operational aspects of the host computer system 32 when host computer system 32 receives a request to modify data in the data volume of memory 40 or any of the virtual copies contained within the memories of FIG. 6. For ease of explanation, volume(x) will represent the data volume in memory x, where x can be any of the memories 40-44 or 80-84. Additionally, $v_x(n)$ and $m_x(n)$ will represent the validity and modification bits, respectively, for block n in memory x, where x can be any of the memories 40-44 or 80-84.

In step 90, host computer system receives a request to modify data of a memory block n in data volume(x) stored in one of the memories x of FIG. 6. In response, host computer 32 accesses the V/$M_x$ table for volume(x) to determine whether the validity bit $v_x(n)$ corresponding to block n of volume(x) is set to 1. If block n of volume(x) does not contain a valid copy (i.e., $v_x(n)$ is set to 0) then the host computer initiates a set of steps 94-104 to copy data into block n of the volume(x) from the parent data volume of volume(x). For ease of illustration, volume(x−1) will be designated the parent volume of volume(x).

Host computer system 32 in steps 94-104 sequentially accesses the V/M tables for the related data volumes from which volume(x) depends until a valid copy of the data sought is found. Thus in step 94, the host computer system sets a dummy variable a to x, the identity of the memory storing volume(x). Thereafter, host computer system, in step 96, decreases the value of a by 1. Volume(a) is the parent of volume(x) after a is decremented. In step 100, host computer system determines whether the V/$M_a$ table corresponding to volume(a) indicates whether the validity bit $v_a(n)$ associated with block n of volume(a) is set to 1. If it is, host computer system 32 copies the contents of block n of volume(a) to block n of volume(x) as shown in step 102. If the validity bit $v_a(n)$ of volume(a) is set to 0, thus indicating that volume(a) does not have a valid copy of data n in block n thereof, then steps 96 and 100 are repeated until a related volume (e.g., volume(a−1), volume(a−2), etc.) is found which contains valid data in block n thereof.

Once the contents of a memory block n from a related volume is copied to block n of volume(x) in step 102, host computer 32 sets the validity bit $v_x(n)$ of volume(x) to 1 as shown in step 104. Thereafter, or in response to host computer 32 confirming that the validity bit $v_x(n)$ of volume (x) is set to 1 in step 92, the host computer 32 determines in step 106 whether a child data volume, data volume(x+1), was created after volume(x). If host computer system 32 determines that volume(x+1) has been created, then host computer system 32 must determine whether block n of volume(x+1) contains valid data. In step 110, host computer system 32 accesses the V/$M_{x+1}$ table for volume(x+1) and checks the state of validity bit $v_{x+1}(n)$ thereof. If the validity bit is set to 1 in accordance with step 110, then host computer 32 proceeds to step 112 and sets the modification bit $m_x(n)$ of volume(x) to 1 and modifies data in block n of volume(x). If, however, in step 110 host computer system 32 determines that the validity bit $v_{x+1}(n)$ of volume(x+1) is set to 0, then the host computer copies the contents of block n of volume(x) to memory block n of volume(x+1) as shown in step 116. Thereafter, host computer system 32 sets the validity bit $v_{x+1}(n)$ of the V/M table corresponding to volume(x+1) to 1 and modifies the data of block n in volume(x) as set forth in step 112.

Figure 8:
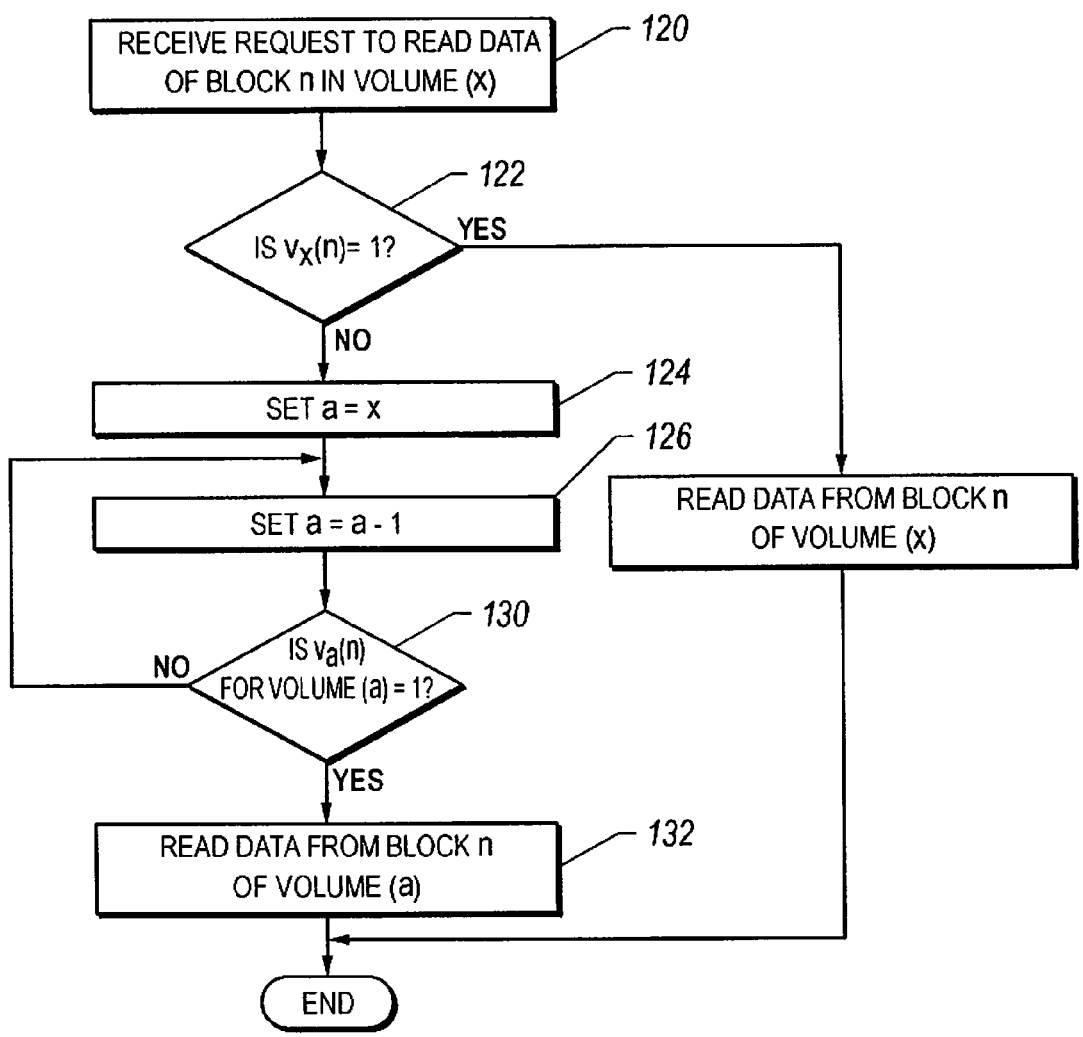
FIG. 8 is a flow chart illustrating operational aspects of reading data from one of the memories of FIG. 6.

Host computer system 32 is configured to read data in any of the data volumes in the memories shown in FIG. 6. FIG. 8 is a flow chart illustrating operational aspects of host computer system 32 reading data from a volume in response to receiving a transactional request. More particularly, as shown in step 120, host computer 32 receives a request to read data of a memory block n in one of the volumes (volume(x)) of FIG. 6. In response, host computer system 32 accesses the V/$M_x$ table for volume(x) to determine whether the validity bit $v_x(n)$ is set to 1. If the validity bit is set to 1, then host computer system reads data from memory block n of volume(x) and the process ends.

If, however, the validity bit $v_x(n)$ of volume(x) is set to 0, then the host computer system reads data from block n of one of the preceding volumes from which volume(x) depends. In accordance thereto, in step 124, host computer system 32 sets a dummy variable a to the value of x, and in step 126, host computer system 32 decrements the dummy variable a by 1. In step 130, host computer system 32 checks the validity bit $v_a(n)$ of volume(a). If this validity bit is set to 1, then volume(a) contains a copy of the data sought. If this validity bit is set to 0, then the process repeats in steps 126-130 until a related data volume (e.g., volume(a−1), volume(a−2), etc.) is found which contains a valid copy of data in block n thereof. Once this data is found, in step 132, host computer system 32 reads data from block n thereof and the process ends.

Figure 9:
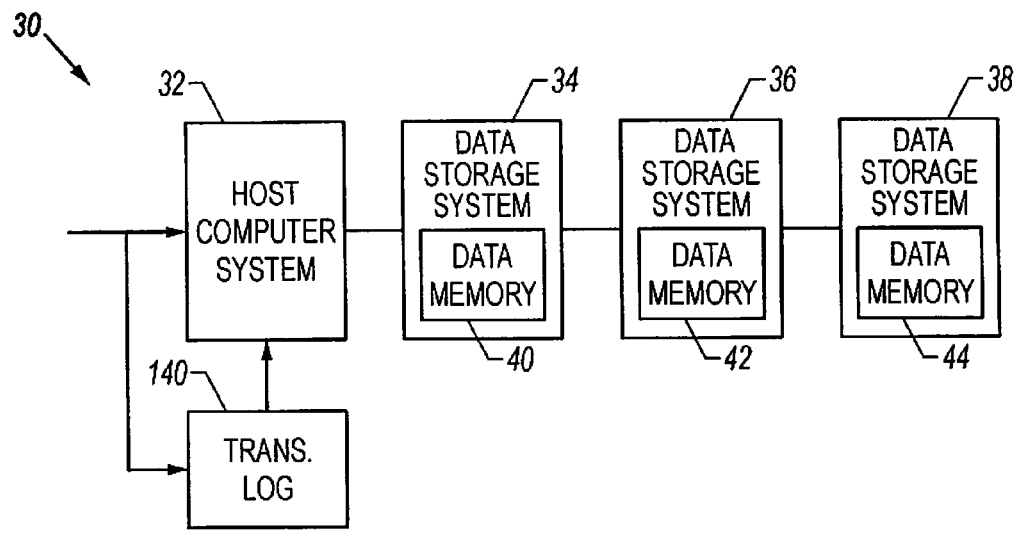
FIG. 9 is a block diagram of a data processing system employing one embodiment of the present invention.

As noted in the Background Section above, the failure of a primary data storage system or the logical corruption of a primary data volume contained therein, is a problem that must be corrected quickly. FIG. 9A shows the data processing system 30 of FIG. 2 in addition to a transaction log 140 added thereto. In FIG. 9A, memory 40 stores a primary data volume accessible by host computer system 32 in response to read and write transaction requests received thereby. Memory 42 stores a backup volume of the primary data volume of memory 40. The backup volume is created by host computer system 32 each time a backup command is initiated. Transaction log 140 stores a copy of all transactional requests that modify data in the primary data volume subsequent to backup in memory 42.

In the prior art, the preferred method to recover from a failure of the primary data storage system or a corruption of data therein, involved first creating an actual copy of the contents of the backup data volume. The backup volume contained in memory 42 could be fully copied into, for example, memory 44. Thereafter, the actual copy in memory 44 could be updated using the transactions contained within the transaction log 140. Once updated, the volume in memory 44 mirrors the primary volume in memory 40 at the point in time just before primary data storage system 34 failed or data contained therein was corrupted. Thereafter, host computer system 32 can resume processing transactions using the updated volume in memory 44. As noted above, this procedure for responding to a failure or corruption of the primary data volume substantially delays the resumption of transactions processing by a business using the data processing system.

Using methods described above, data processing system 30 can recover from a failure of storage system 34 or corruption of the primary data volume in a shorter amount of time. To illustrate, suppose host computer system 32 in FIG. 9A creates a virtual copy of the backup contained within memory 42 just after a failure of primary data storage 34 or corruption of data therein using methods described above. This virtual copy is created instantly in memory 44.

Thereafter, host computer system 32 applies transactions stored within transaction log 140 to the virtual copy created in memory 44 using the method described with reference to FIG. 4B. As will be expected, data from some memory blocks of memory 42 must be first copied to their corresponding block in memory 44 before data in memory 44 can be modified by transactions of log 140. Once all the transactions from log 140 are applied, the virtual copy of data contained within memory 44 can be viewed as if its contents mirrored the contents of memory 40 at the point in time when storage system 34 failed or data therein was corrupted. Host computer system 32 can then access memory 40 in accordance with transactions received after failure of storage system 34 or corruption of the primary data volume therein. Host computer system 32 need not wait for the entire contents of the backup volume in memory 42 to be actually copied to memory 44. Thus, host computer system 32 can resume processing transactions (using methods described with reference to FIGS. 4B and 4C) soon after a failure of primary data storage system 34 or a corruption of data therein when compared to the prior art.

The virtual copy in memory 44 can be used to restore the contents of the primary volume in memory 40. Suppose, host computer system 32 creates the virtual copy in memory 44 in response to a physical failure of data storage system 34. As set forth above, a virtual copy of the backup, updated in accordance with all the transactions in log 140, can be created in memory 44. However, rather than modifying data of the virtual copy in memory 44 according to transactions received by host computer system 32 after the physical failure as described above, host computer instead creates a virtual copy of the updated virtual copy. FIG. 9B is the data processing system of FIG. 9A with an additional data storage system 70 added thereto.

With reference to FIG. 9B, the virtual copy of the virtual copy can be created in memory 80 of data storage system 70 according to methods described above. Host computer system 32 creates a V/M table for virtual copy in memory 80. Thereafter, host computer system 32 modifies data in the virtual copy of memory 80 according to transactions that were received by host computer system 32 after failure of data storage system 34. Host computer modifies data in memory 80 using the method described in FIG. 7. As a result, several modification bits m(n) for the newly created V/M table will be set to 1.

Suppose further that storage system 34 is eventually repaired such that host computer system 32 can resume access thereof. When repaired memory 40 can be quickly restored to the contents of memory 80. The restore process includes host computer 32 replacing the contents of memory blocks in memory 40 with the contents of corresponding memory blocks in memory 80 which have corresponding modification bits m(n) set to 1. For example, suppose only data in memory blocks designated 3, 4, and 9 of memory 80 were modified since the creation of the virtual copy in memory 80. As such only modification bits m(3), m(4) and m(9) of the newly created V/M table are set to 1. To restore memory 40 to the contents of memory 80, host computer system 32 only needs to copy the contents of memory blocks 3, 4, and 9 of memory 80 to memory blocks 3, 4 and 9, respectively, of memory 40. Using this method, the primary data volume of memory 40 can be restored after system 34 recovers from its failure.

Figure 10:
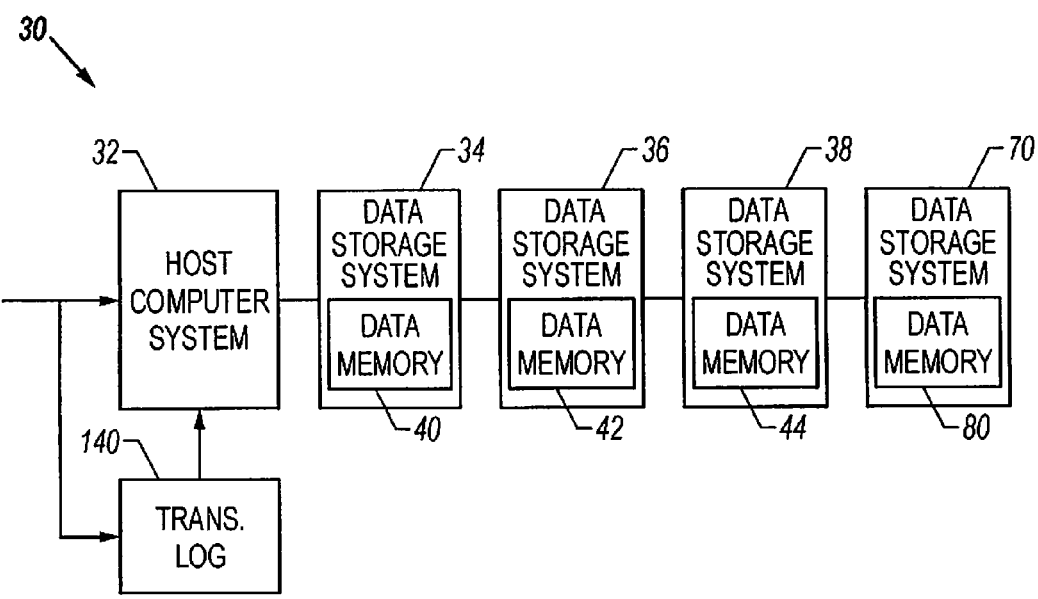
FIG. 10 is data processing system of FIG. 9 with an additional data storage system added thereto.
Figure 11:
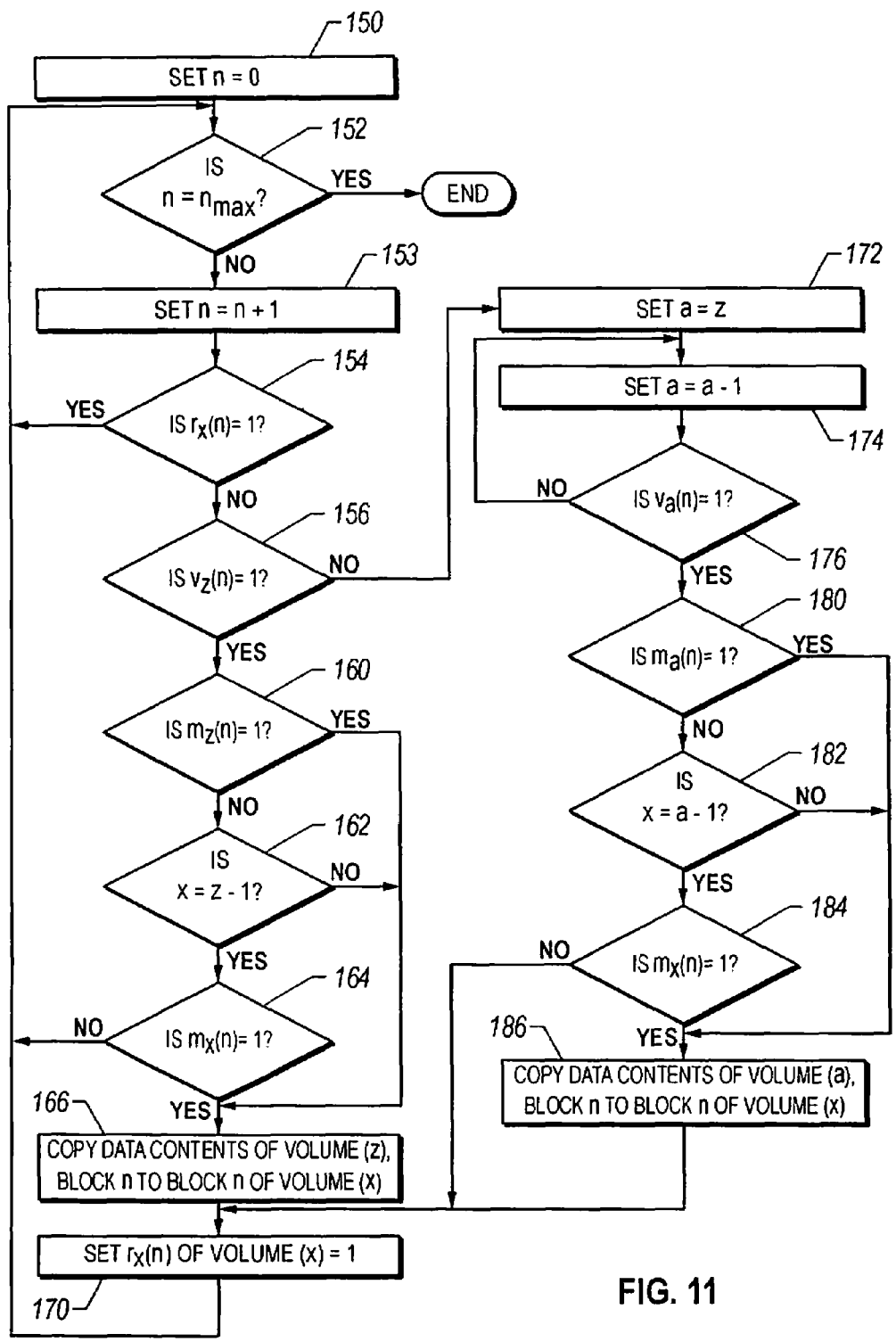
FIG. 11 is a flow chart illustrating operational aspects of restoring volume of one memory in FIG. 6 to the contents of the volume of another memory of FIG. 6.

FIG. 10 and its associated description illustrate one method by which one primary data volume can be restored to the contents of a virtual data volume. This method makes use of the modification bits m(n) of V/M tables. In general, the modification bits of the V/M tables enables one volume to be restored quickly to the contents of another volume. FIG. 11 is a flow chart illustrating operational aspects of host computer system 32 restoring the volume(x) to the contents of the volume(z). For purposes of explanation, volume(x) and volume(z) will be two of the data volumes contained within memories 40-44 and 80-84 of FIG. 6. FIG. 12A shows the V/M tables 120 and 122 corresponding to volume (x) and volume(z), respectively, at a point in time when host computer system 32 receives a request to restore volume(x) to the contents of volume(z). In one embodiment, host computer system 32 can instantly access volume(x) after initiating the command to restore volume(x) to the contents of volume(z). To this end, when the restore command is initiated, host computer system 12 adds a third column to the V/M table corresponding to volume(x). FIG. 12B illustrates table 120 with the third column designated $r_x(n)$ added thereto. $R_x(n)$, when set to 1, indicates that the corresponding memory block n of volume(x) has been restored to the contents of memory block n of volume(z). Once the entire data volume(x) has been restored, the $r_x(n)$ column can be eliminated from table 120. However, column $r_x(n)$ allows immediate access of volume(x) after the restore command has been initiated by host computer system 32 as will be more apparent below.

Referring to FIG. 11, initially, host computer system sets n to 0 in step 150. In step 152, host computer system determines whether the current value of n equals $n_{max}$. If it does, then the restore process has been completed. Initially, however, with n equal to 0, the process proceeds to step 152 where host computer system 32 increments n by 1. Host computer system 32, in step 154, checks the state of $r_x(n)$ to determine if it is set to 1 or 0. If it is set to 1, the corresponding memory block n of volume(x) has been restored and the process can proceed to the next memory block. If $r_x(n)$ is set to 0, then the contents of block n have not been restored and the process proceeds to step 156 where a determination is made as to whether the validity bit $v_z(n)$ for volume(z) is set to 1 or 0. If $v_z(n)$ of volume(z) is set to 1 then the process proceeds to step 160 where the modification bit $m_z(n)$ of block n in volume(z) is determined. If data within block n of volume(z) has been modified, then $m_z(n)$ is set to 1 and the process proceeds to step 162 where a determination is made as to whether volume(z) is a virtual copy of volume(x). If volume(z) is not a virtual copy of volume(x) then, since block n of volume(z) contains valid and modified data, the contents of block n of volume(z) is copied to block n of volume(x) in step 166 and the $r_x(n)$ bit is set to 1 indicating that the contents of block n of volume(x) have been restored. The process then repeats starting with step 152.

If, however, in step 162 host computer system determines that volume(z) is a virtual copy of volume(x), then host computer determines in step 164 whether the data of block n of volume(x) has been modified. If it has not been modified, then the contents of block n in volumes(x) and volumes(z) are identical and no copying needs to be performed. However, if in step 164 $m_x(n)$ is set to 1, then the contents differ between block n of volume(x) and volume(z), thus requiring the data contents of block n of volume(z) to be copied to block n of volume(x).

Returning to step 156, if during the process host computer system 32 determines that block n of volume(z) does not contain valid data (i.e. $v_z(n)$ is set to 0), then the process proceeds to step 172 where host computer system 32 sets a dummy variable a to z, the memory in which volume(z) is contained. Thereafter, host computer system 32 decrements dummy variable a by 1 in step 174 and checks the state of $v_a(n)$ of volume(a) in step 176. At this point, volume(a) is the parent of volume(z). If $v_a(n)$ for volume(a), is set to 0, then block n of volume(a) does not contain valid data and host computer system 32 repeats steps 174 and step 176 until host computer system 32 finds valid data in block n of a related volume.

Once valid data is found in block n of a related volume, then the process proceeds to step 182 where host computer system 32 determines whether volume(a) is a virtual copy of the volume(x). If volume(a) is not a virtual copy of volume (x), then because volume(a) contains valid and modified data in block n, the contents of volume(a), block n are copied to block n of volume(x) in step 184, and in step 170, the host computer system 32 sets $r_x(n)$ for volume(x) to 1. If, however, volume(a) is a virtual copy of volume(x), then in step 184 host computer system 32 determines whether data of block n of volume(x) has been modified. If so, the contents in block n of volume(a) and volume(x) are different thereby requiring the copying of data from block n of volume(a) to block n of volume(x) as shown in step 186. Eventually, in step 170, host computer system 32 sets $r_x(n)$ for volume(x) to 1 and the process proceeds to step 152 to determine whether all blocks of volume(x) have been restored.

Figure 13:
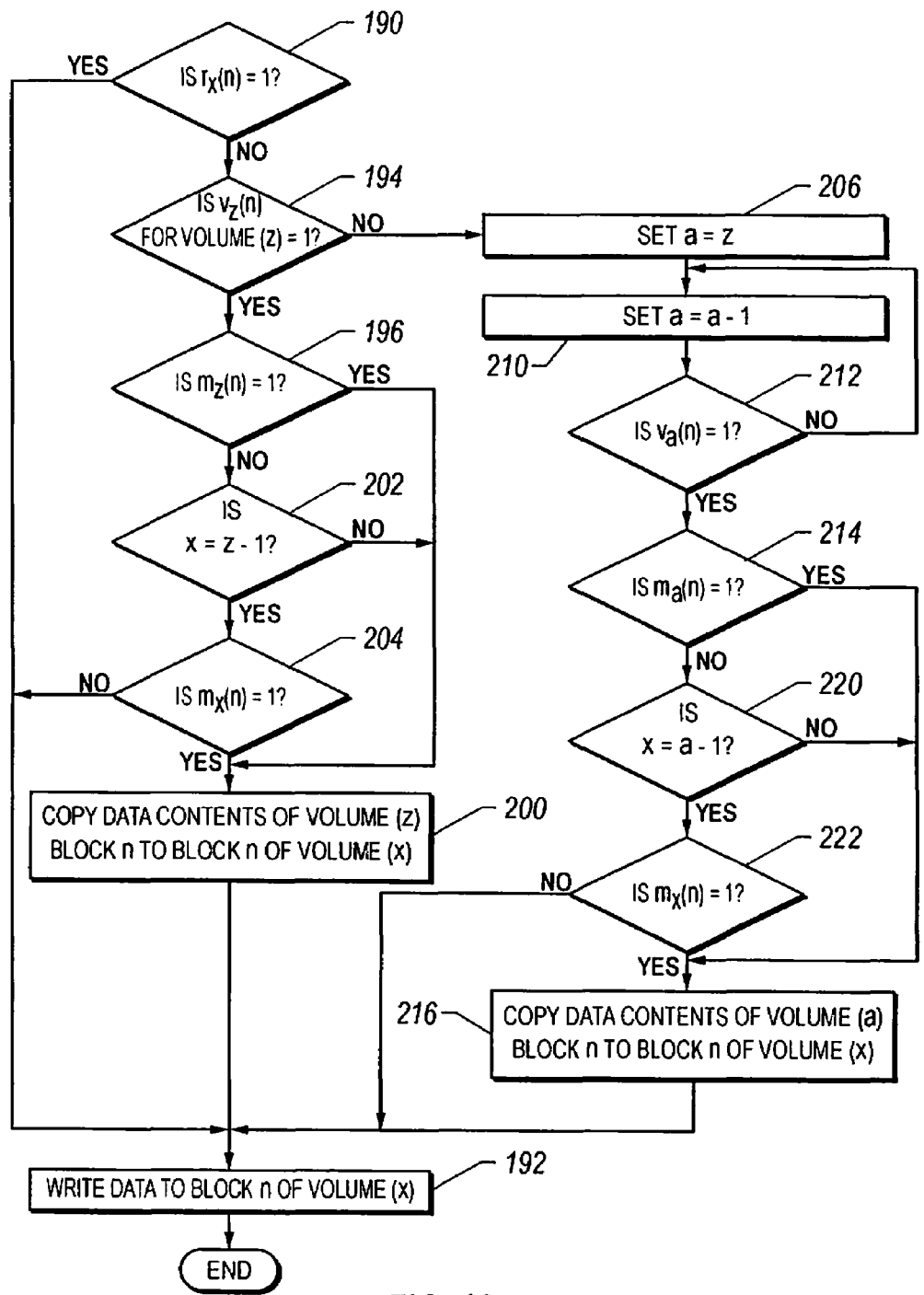
FIG. 13 is a flow chart illustrating operational aspects for writing data to a volume in memory of FIG. 6.

As noted earlier, host computer system 32 can access the restored volume(x) instantly after initiation of restore command and prior to completion of the restore command. FIG. 13 illustrates operational aspects of writing to volume(x) after a restore command has been initiated to restore volume (x) to the contents of volume(z) but before completion of restoration of volume(x). More particularly, in step 190, host computer system 32 determines whether the restore bit $r_x(n)$ corresponding to block n of volume(x) is set to 1. This presumes that the additional column $r_x(n)$ is present in the table corresponding to volume(x). If column $r_x(n)$ is not present, then volume(x) is not the subject of restore when host computer system 32 receives a request to write to block n of data volume(x). If $r_x(n)$ is determined to be 1 in step 190, then the process proceeds to step 192 and host computer system 32 writes data to block n of volume(x) in accordance with the write command received by host computer system 32. Step 192 is performed at this point because block n of volume(x) has been previously restored. If block n is not restored prior to fulfilling the write command, then data within block n of volume(x) may become corrupted.

If in step 190 it is determined that $r_x(n)$ is not set to 1 thus indicating that block n of volume(x) has not been restored, the process proceeds to step 194 where the validity of block n in volume(z) is checked. If block n of volume(z) contains valid data then the process proceeds to step 196 where host computer system 32 determines whether data in block n of volume(z) has been modified. If it has been modified, then a difference exists between the data contained in volume(z), block n and volume(x) block n. As a result, host computer system in step 200 copies the contents of block n from volume(z) to block n of volume(x). In essence, host computer system 32 performs a restore of block n in volume(x) in step 200. When restored, host computer system 32 can write data to block n of volume(x) in accordance with the command by host computer system 32 in step 192. If however, in step 196, it is determined that valid data in block n of volume(z) has not been modified, then the host computer determines in step 202 whether volume(z) is a virtual copy of volume(x). Again, if volume(z) is not an virtual copy of volume(x), then the host computer 32 copies the contents in step 200 and then host computer system 32 writes data to block n of volume(x) in accordance with step 192. If it is determined that volume(z) is a virtual copy of volume(x) in step 222, then the host computer in step 204 determines whether block n data of volume(x) has been modified in step 204. If data has been modified in block n of volume(x), then there is a difference between the data in block n of volume (x) and Z. As such, the contents of volume z, must be copies to block n of volume(x). In step 200 before data is written to block n of volume(x) in accordance with the write command received by host computer system 32.

If, in step 194, host computer system determines that block n of volume(z) does not contain valid data, then host computer system 32 must find a related volume from which data can be copied if need be. To this end, host computer system 32 sets a dummy variable a to z in step 206. The host computer then decrements the dummy variable a by 1 and accesses the V/M table corresponding to volume(a) to determine whether block n thereof contains valid data in step 212. If volume(a) contains a valid copy of data in block n, then host computer in step 214 determines whether that data has been modified. If the data has been modified in accordance with a determination made in step 214, then the contents between block n and volume(x), is different thus requiring the data contents of volume(a) block n to be copied to block n of volume(x) in step 216. Thereafter, block n of volume(x) has been restored and host computer system 32 can write data to block n of volume(x). If, in step 214, the host computer determines that data within block n of volume(a) has not been modified, then host computer system determines in step 220 whether volume(a) is a virtual copy of volume(x). If it is not, data is copied from block n of volume(a) to block n of volume(x). If however, volume(a) is a virtual copy of volume(x), then in step 222 host computer determines whether the data in block n of volume(x) has been modified. If so, the data contents in block n of volume(x) differs from the data contents of block n in data volume a and the host computer 32 copies the contents of volume(a), block n to block n of volume(x) in step 216. If however, the data contents of block n of volume(x) has not been modified, then the contents of block n of volume(a) and volume(x) are identical and need not be restored before the write operation in step 192.

Figure 14:
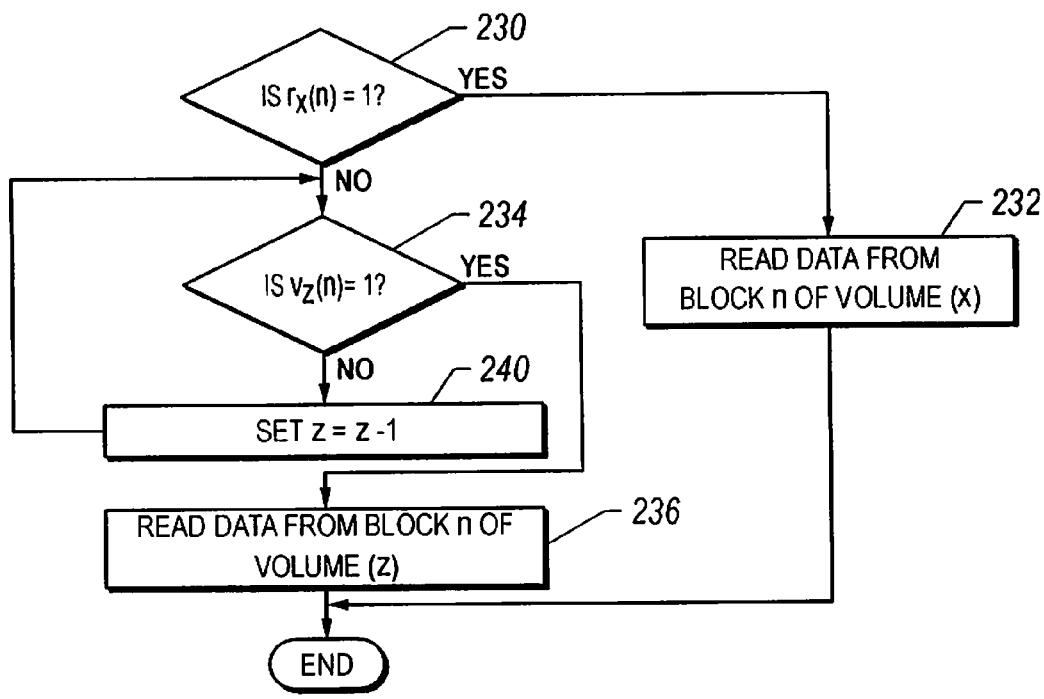
FIG. 14 is a flow chart illustrating operational aspects of reading data from a memory of FIG. 6.

As noted above, host computer system 32 may execute a request to read data in block n after a restore of volume(x) has initiated but before the entire volume of volume(x) has been restored to the contents of volume(z). FIG. 14 is a flow chart illustrating operational aspects of one embodiment for reading data from block n of volume(x) after initiation of the command to restore volume(x) to the contents of volume(z). In step 230 host computer system 32 first determines whether $r_x(n)$ for volume(x) is set to 1 or whether the memory block n of the read command has been previously restored to the contents of block n of volume(z). If restoration of block n in volume(x) has occurred, then the host computer can execute the read command and accordingly read data from block n of volume(x) as shown in step 232. If, however, in step 230 it is determined that block n of volume(x) has yet to be restored, then in step 234, host computer 32 determines whether block n of volume(z)

contains valid data. If it does, then a host computer reads data from block n of volume(z) in step 236. If, however, in step 234 the host computer determines that memory block n of volume(z) does not contain valid data, then in step 240 the host computer decrements z by 1 and repeats process step 234 until an intermediate volume is found which contains valid data in block n thereof.

Although the present invention has been described in connection with several embodiments, the invention is not intended to be limited to the specific forms set forth herein, but on the contrary, it is intended to cover such alternatives, modifications, and equivalents as can be reasonably included within the scope of the invention as defined by the appended claims.

What is claimed is:

1. A method comprising:
    copying data from a memory region of a first memory to a memory region of a second memory;
    setting a first bit in memory that corresponds to the memory region of the second memory, wherein the first bit is set to indicate that the memory region of the second memory stores data copied from the memory region of first memory;
    modifying data stored in the memory region of the second memory after data is copied from the memory region of the first memory to the memory region of the second memory;
    setting a second bit in memory, wherein the second bit is set to indicate that the data stored in the memory region of the second memory has been modified since data stored in the memory region of the second memory was copied from the memory region of the first memory.

2. The method of claim 1 further comprising:
    copying data from a second memory region of the first memory to a second memory region of the second memory;
    wherein modifying data stored in the memory region of the second memory occurs before copying data from the second memory region of the first memory to the second memory region of the second memory.

3. The method of claim 1 wherein data is copied from the memory region of the first memory to the memory region of the second memory in response to a request to modify data in the memory region of the second memory.

4. The method of claim 1 further comprising modifying data stored in the memory region of the first memory, wherein data is copied from the memory region of the first memory to the memory region of the second memory before data is modified in the memory region of the first memory.

5. The method of claim 1 further comprising:
    copying data from the memory region of the second memory to a memory region of a third memory, wherein the third memory comprises a plurality of memory regions, and wherein the data is copied from the memory region of the second memory to the memory region of the third memory before data stored in the memory region of the second memory is modified;
    setting a third bit in memory that corresponds to the memory region of the third memory, wherein the third bit is set to indicate that the memory region of the third memory stores data copied from the memory region of second memory.

6. The method of claim 5 further comprising:
    modifying data stored in the memory region of the third memory;
    setting a fourth bit in memory, wherein the fourth bit is set to indicate that data stored in the memory region of the third memory has been modified since the data stored in the memory region of the third memory was copied from the memory region of the second memory.

7. The method of claim 1 wherein the second bit is set before data stored in the memory region of the second memory is actually modified.

8. The method of claim 1 wherein the second bit is set after data stored in the memory region of the second memory is actually modified.

9. A computer readable memory for storing instructions executable by a computer system, wherein the computer system performs a method in response to executing the instructions, the method comprising:
    creating a first virtual copy of data stored in a first memory, wherein the first virtual copy is created using a second memory;
    creating a second virtual copy of data stored in the first memory, wherein the second virtual copy is created using a third memory, and wherein the second virtual copy is created after the creation of the first virtual copy;
    converting the first virtual copy into a first real copy by copying all data stored in the first memory to the second memory.

10. A computer readable memory for storing instructions executable by a computer system, wherein a method is performed in response to executing the instructions, the method comprising:
    creating a virtual copy of data stored in a first memory, wherein the virtual copy of data stored in the first memory is created using a second memory in response to a request to create a copy of all data stored in the first memory;
    copying first data from the first memory to the second memory in response to generation of a request to modify the first data in the first memory;
    modifying the first data in the first memory after the first data is copied from the first memory to the second memory.

11. The computer readable memory of claim 10 wherein the second memory has a total memory space equal to or greater than a total memory space of the first memory.

12. A computer readable memory for storing instructions executable by a computer system, wherein a method is performed in response to executing the instructions, the method comprising:
    creating a virtual copy of data stored in a first memory, wherein the virtual copy of data is created in response to a request to create a copy of data stored in the first memory;
    creating first and second tables in memory each one of which comprises a plurality of multibit entries;
    wherein each entry of the first table corresponds to a respective memory region of the first memory;
    wherein each entry of the second table corresponds to a respective memory region of a second memory;
    wherein each first bit of the first table indicates whether the corresponding memory region of the first memory contains data;
    wherein each second bit of the first table indicates whether data in the corresponding memory region of the first memory has been modified since the first table was created;

wherein each first bit of the second table indicates whether the corresponding memory region of the second memory contains data copied from the first memory;
    wherein each second bit of the second table indicates whether data in the corresponding memory region of the second memory has been modified since the second table was created.
13. The computer readable memory of claim 12 wherein the method further comprises:
    copying data from the memory region of the first memory to the memory region of the second memory in response to a request to modify data in the memory region of the second memory;
    setting a first bit of one entry of the second table that corresponds to the memory region of the second memory, wherein the first bit of the one entry of the second table is set to indicate that the memory region of the second memory stores data copied from the memory region of first memory;
    modifying data stored in the memory region of the second memory after data is copied from the memory region of the first memory to the memory region of the second memory;
    setting a second bit of the one entry of the second table, wherein the second bit of the one entry of the second table is set to indicate that the data stored in the memory region of the second memory has been modified since data was copied from the memory region of the first memory to the memory region of the second memory.
14. A computer readable memory for storing instructions executable by a computer system, wherein a method is performed in response to executing the instructions, the method comprising:
    copying data from a memory region of the first memory to a memory region of a second memory;
    setting a first bit in memory that corresponds to the memory region of the second memory, wherein the first bit is set to indicate that the memory region of the second memory stores data copied from the memory region of first memory;
    modifying data stored in the memory region of the second memory after data is copied from the memory region of the first memory to the memory region of the second memory;
    setting a second bit in memory, wherein the second bit is set to indicate that the data stored in the memory region of the second memory has been modified since data was copied from the memory region of the first memory to the memory region of the second memory.
15. The computer readable memory of claim 14 wherein the method further comprises:
    copying data from a second memory region of the first memory to a second memory region of the second memory;
    wherein modifying data stored in the memory region of the second memory occurs before copying data from the second memory region of the first memory to the second memory region of the second memory.
16. The computer readable memory of claim 14 wherein the method further comprises copying data from the memory region of the first memory into the memory region of the second memory in response to generation of a request to modify data in the memory region of the second memory.
17. The computer readable memory of claim 12 wherein the method further comprises creating a virtual copy of data stored in the second memory, wherein the virtual copy of data stored in the second memory is created in a third memory in response to a request to create a copy of all data stored in the second memory, and wherein the third memory has usable memory space equal to or greater than a total usable memory space of the second storage device.
18. A system comprising:
    a computer system;
    a first data storage system coupled to the computer system, wherein the first data storage system comprises a first memory;
    a second data storage system coupled to the computer system, wherein the second data storage system comprises a second memory;
    wherein the computer system comprises a processor for executing instructions and a memory that stores instructions executable by the processor to implement a method, the method comprising:
    creating a virtual copy of data stored in the first memory, wherein the virtual copy of data stored in the first memory is created using the second memory in response to generation of a request to create a copy of the data stored in the first memory;
    copying first data from the first memory to the second memory in response to generation of a request to modify the first data in the first memory;
    modifying the first data in the first memory after the first data is copied from the first memory to the second memory.
19. An apparatus comprising:
    a first memory;
    a second memory coupled the first memory, wherein a total memory space of the second memory is equal to or greater than a total memory space of the first memory;
    means for creating a virtual copy of data stored in the first memory, wherein the virtual copy of data stored in the first memory is created using the second memory in response to generation of a request to create a copy of the data stored in the first memory;
    means for copying first data from the first memory to the second memory in response to generation of a request to modify the first data in the first memory;
    means for modifying the first data in the first memory after the first data is copied from the first memory to the second memory.
20. A computer readable memory for storing instructions executable by a computer system, wherein a method is performed in response to executing the instructions, the method comprising:
    creating a virtual copy of data stored in a first memory, wherein the virtual copy of data stored in the first memory is created in response to a request to create a copy of all data stored in the first memory;
    copying data from a memory region of the first memory to a memory region of a second memory;
    setting a first bit in memory that corresponds to the memory region of the second memory, wherein the first bit is set to indicate that the memory region of the second memory stores data copied from the memory region of first memory;
    modifying data stored in the memory region of the second memory after data is copied from the memory region of the first memory to the memory region of the second memory;
    setting a second bit in memory, wherein the second bit is set to indicate that the data stored in the memory region of the second memory has been modified since data was copied from the memory region of the first memory to the memory region of the second memory.

21. The computer readable memory of claim 20 wherein the method further comprises:
    copying data from a second memory region of the first memory to a second memory region of the second memory;
    wherein modifying data stored in the memory region of the second memory occurs before copying data from the second memory region of the first memory to the second memory region of the second memory.

22. The computer readable memory of claim 20 wherein the method further comprises copying data from the memory region of the first memory into the memory region of the second memory in response to generation of a request to modify data in the memory region of the second memory.

23. A system comprising:
    means for copying data from a memory region of a first memory to a memory region of a second memory;
    means for setting a first bit in memory that corresponds to the memory region of the second memory, wherein the first bit is set to indicate that the memory region of the second memory stores data copied from the memory region of first memory;
    means for modifying data stored in the memory region of the second memory after data is copied from the memory region of the first memory to the memory region of the second memory;
    means for setting a second bit in memory, wherein the second bit is set to indicate that the data stored in the memory region of the second memory has been modified since data stored in the memory region of the second memory was copied from the memory region of the first memory.

24. A computer readable memory for storing instructions executable by a computer system, wherein the computer system performs a method in response to executing the instructions, the method comprising:
    creating a first virtual copy of data stored in a first memory;
    creating a second virtual copy of data stored in the first memory, wherein the second virtual copy is created after the creation of the first virtual copy;
    modifying first data in the first memory in response to generation of a request to modify the first data;
    copying the first data to respective memories that are used to store data of the first and second virtual copies before the first data in the first memory is modified.

25. A computer readable memory for storing instructions executable by a computer system, wherein a method is performed in response to executing the instructions, the method comprising:
    creating a virtual copy of data stored in a first memory in response to generation of a request to create a copy of all data stored in the first memory;
    converting the virtual copy into a real copy of the data stored in the first memory by copying all data stored in the first memory to a second memory;
    modifying first data in the first memory in response to generation of a request to modify the first data;
    copying the first data to the second memory before the first data is modified.

26. A computer readable memory for storing instructions executable by a computer system, wherein a method is performed in response to executing the instructions, the method comprising:
    creating $n_{max}$ first entries in memory;
    creating $n_{max}$ second entries in memory;
    creating $n_{max}$ third entries in memory;
    wherein each of the first entries corresponds to a respective memory region of the first memory;
    wherein each respective pair of the second and third entries corresponds to a respective memory region of a second memory;
    wherein each first entry comprises data indicting whether its corresponding memory region of the first memory contains data that has been modified since creation of the second and third entries;
    wherein each second entry comprises data indicating whether its corresponding memory region of the second memory contains data copied from a respective memory region of the first memory;
    wherein each third entry comprises data indicting whether its corresponding memory region of the second memory contains data that has been modified since creation of the second and third entries.

27. A method comprising:
    creating $n_{max}$ first entries in memory;
    creating $n_{max}$ second entries in memory;
    creating $n_{max}$ third entries in memory;
    wherein each of the first entries corresponds to a respective memory region of the first memory;
    wherein each respective pair of the second and third entries corresponds to a respective memory region of a second memory;
    wherein each first entry comprises data indicting whether its corresponding memory region of the first memory contains data that has been modified since creation of the second and third entries;
    wherein each second entry comprises data indicating whether its corresponding memory region of the second memory contains data copied from a respective memory region of the first memory;
    wherein each third entry comprises data indicting whether its corresponding memory region of the second memory contains data that has been modified since creation of the second and third entries.

* * * * *